July 7, 1931. C. DOLLACK 1,812,937
SCALE
Filed March 21, 1929 2 Sheets-Sheet 2

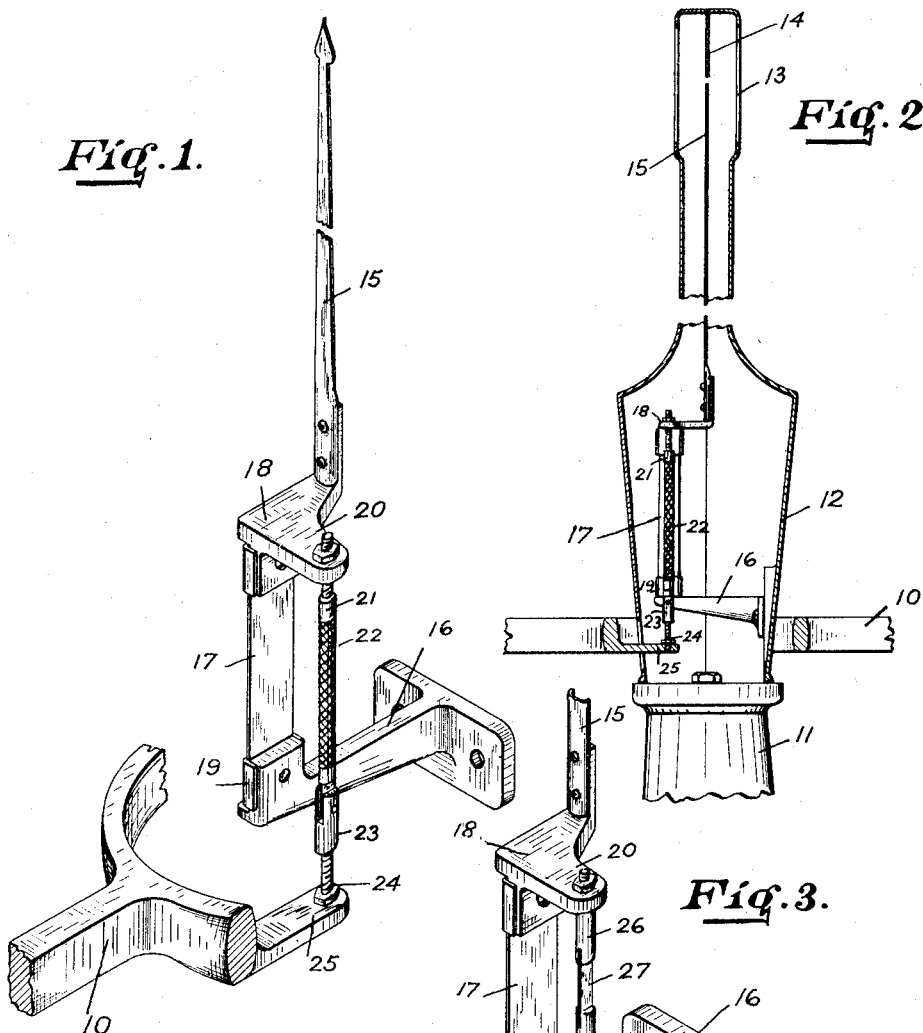
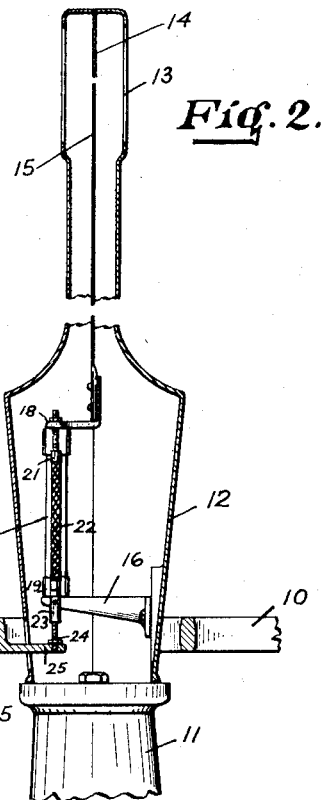
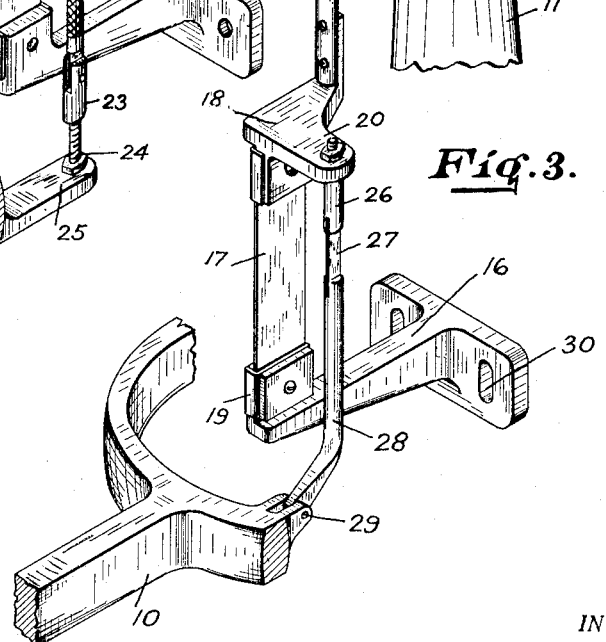

INVENTOR.
Charles Dollack.
BY Duell, Dunn & Anderson.
ATTORNEYS.

Patented July 7, 1931

1,812,937

UNITED STATES PATENT OFFICE

CHARLES DOLLACK, OF BROOKLYN, NEW YORK, ASSIGNOR TO THE JACOBS BROS. CO. INC., OF BROOKLYN, NEW YORK, A CORPORATION OF NEW YORK

SCALE

Application filed March 21, 1929. Serial No. 348,827.

This invention relates to a scale and aims to provide a device of this character possessing functionally and structurally improved characteristics.

The several features of the invention may be employed to advantage in numerous different types of scales and it is intended that the annexed specification and drawings be interpreted accordingly where the claims do not limit the features of the invention for use in connection with a certain type of scale. However, these features are primarily intended to be employed in a scale of the over- and under-weight type in that they are of particular value in such an association, and in the illustrated embodiment, the disclosure has been accordingly defined.

In such a specific aspect, it is an object of the invention to construct a scale of the over- and under-weight type and in which the amount of deflection of the beam from a horizontal or neutral condition will be indicated accurately and, additionally, in which such indication will register the amount of excess or lack of weight required to establish a neutral or balanced condition of the beam; the registering mechanism provided for this purpose having a magnified range of movement and the scale embodying the features of the invention being capable of placement on a supporting surface which is not entirely level without detriment to the proper functioning of the scale.

A further object of the invention is that of constructing an over- and under-weight scale preferably of the "cross-tower" type but not necessarily so and in which the desired results will be achieved in a most desirable manner.

An additional object is that of providing a device of this type, the parts of which will be relatively few in number and individually simple and rugged in construction, these parts being capable of ready assemblage by relatively unskilled labor to furnish a scale which may be constructed at relatively nominal cost and which will operate over long periods of time with freedom from mechanical difficulties.

With these and other objects in mind, reference is had to the attached sheets of drawings illustrating practical embodiments of the invention and in which:

Fig. 1 is a fragmentary perspective view of the operating mechanism of scale of the over- and under-weight class and of the "cross-tower" type;

Fig. 2 is a sectional side view thereof;

Fig. 3 is a view similar to Fig. 1 but showing a slightly different form of mechanism;

Figure 4:
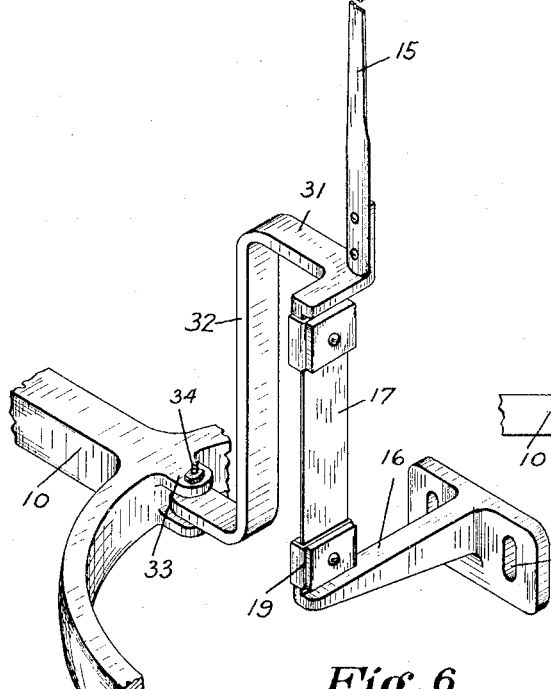
Figs. 4 and 6 are views similar to Figs. 1 and 3, but showing mechanisms to be embodied in scales in which the registering mechanism has movement in a plane parallel to the beam movements.

It will be noted that the reference numeral 10 indicates a beam suitably supported upon bearings and having at its outer ends pan supports usually connected by a check rod structure and carrying pans, one adapted to receive weights and the other receiving articles to be weighed. None of these elements have been shown in view of the fact that their structure forms no part of the present invention and various types of these elements are moreover well known to those skilled in the art.

Extending from the scale base is a support or pedestal 11 which carries a housing 12, presenting at its upper end a display window or opening 13 within which a suitable graduated chart 14 is visible, the indicia of such chart being traversed by a pointer 15.

Now referring to Figs. 1, 2 and 3, it will be noted that the pointer or other movable part of the registering mechanism has movements transverse of the plane of movement of the scale beam. In other words, this scale is of the "cross-tower" type and the mounting of the movable part of the registry mechanism (i. e. in the embodiment illustrated, the pointer 15) is effected by the use of a bracket 16 mounted upon the inner face of the housing 12 and carrying the lower end of a flexion strip or other suitable resilient element 17. The upper end of this element is secured to a bracket 18 mounting the pointer 15 and at this time, it will be noted that the attachment of the ends of the flexion strip to the respective elements connected thereto is effected preferably by clamping structures 19 capable of a certain measure of adjustment. Thus the effective length of the flexion strip may be varied and moreover the rigidity or resistance offered thereby may likewise be varied. Accordingly, with the parts of the scale assembled, the tester may readily make such adjustments as are necessary in order to finally "set up" the scale. The bracket 18 has an extension 20, and in Figs. 1 and 2, this extension adjustably carries one end of a mounting member 21 which is continued in the form of a relatively stiff cable 22 having a certain amount of flexibility and resiliency and the lower end of which terminates in a suitable connecting portion rockingly attached to a pivot member 23. The latter is preferably adjustably mounted as at 24 upon an extension 25 forming a part of the beam.

It is obvious in a scale of this type that with the beam properly mounted and balanced, the scale need not necessarily be placed upon an entirely level surface and the flexion strip will serve to maintain this beam in neutral position. Any deflection of the beam from such position will be registered in a magnified manner by the pointer moving with respect to the dial or chart, and the amount of over or under-weight will be indicated accurately.

In Fig. 3, in lieu of the pivots and the structure associated therewith, a stud 26 is adjustably secured to the extension of the bracket and this stud carries the upper end of a secondary flexion strip 27 which will serve accurately to transmit thrusts. The lower end of the strip 27 is secured to a bar 28 which in turn has its lower end rockingly attached as at 29 to the scale beam. Thus, in this structure, two flexion strips or resilient elements are provided which to a certain extent will counteract each other to effect an extremely desirable result. More particularly, as the main flexion strip is deflected, the secondary strip will be deflected to an even greater extent incident to the leverage exerted by the extension of the bracket 18 and consequently aside from the fact that there will be no tendency of the parts to bind, these parts will resist deflection to a satisfactory extent. It will also be obvious that this will be true in the structure shown in Fig. 1 in which direct thrusts will be transmitted and a cooperative result will be achieved in the conjoint actions of the wire and strip. Moreover, it will be understood that in lieu of the braided cable or flexion strip 27, numerous other forms of connecting elements having flexible and/or resilient characteristics might be employed.

In connection with Fig. 3, it will be noted moreover that the bracket 16 has openings 30 through which the members attaching it to the housing or other support may pass. Due to the fact that these openings are somewhat extended, it is obvious that in "setting up" the scale, the entire bracket and its assembled structure may be adjusted by the tester to occupy exactly the proper relative position with respect to the scale which will assure perfect accuracy throughout the life of the latter and thereupon the position of this bracket may be fixed. In the structure of Fig. 3, it will also be apparent that a scale is furnished, the registering mechanism of which is centrally located with respect to the beam and which registering mechanism moves transversely of the beam when the latter rocks.

Figure 5:
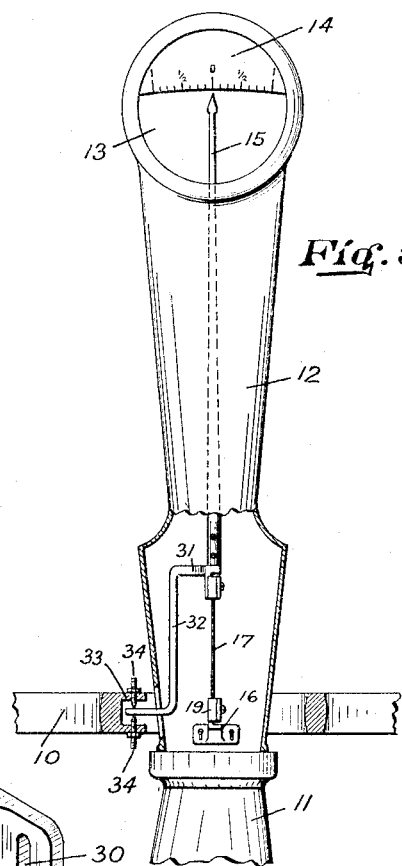
Fig. 5 is a partly sectional side view of the mechanism as shown in Fig. 4.

Now referring to Figs. 4 and 5, it will be observed that the bracket 16, clamping elements 19 and flexion strip 17 are in all respects similar to those previously described with the exception that these elements have been shifted through an arc of 90 degrees so that the pointer carried by the upper end of the flexion strip will have movements in a plane parallel to that in which the beam moves. This pointer is carried by a bracket 31 which has a rigid extension 32 extending downwardly from its body and terminating adjacent and, in fact, extending into a forked portion 33 forming a part of the beam. The arms of this position carry adjustably mounted pins 34, the ends of which are reduced and slidingly bear against the upper and lower faces of the extension so as to shift the latter and the bracket with a minimum of friction.

In this form of scale, the bracket 16 is capable of adjustment similar to the manner in which the bracket of Fig. 3 is capable thereof, and at this time, it will be appreciated that, if desired, the bracket shown in Figs. 1 and 2 might likewise be adjustable.

Figure 6:
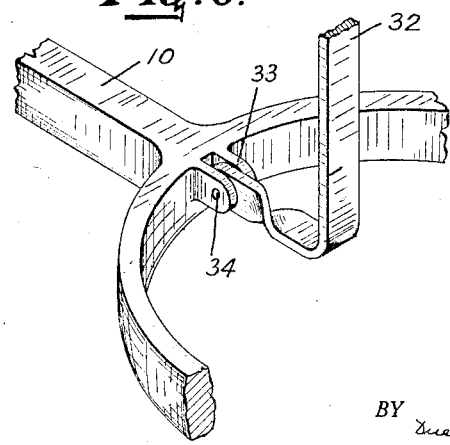

Finally, referring to Fig. 6, it will be seen that a structure has been presented which in all respects will be similiar to that shown in Figs. 4 and 5, with the exception that the extension 32 of the bracket terminates in a portion extending between spaced lugs 33 forming a part of the scale beam and to which lugs it is pivotally connected as at 34, it being obvious that with this construction, the same results will again be achieved.

In all of the several forms of scale herein illustrated, it will be noted that but a single movable connection is provided. Thus in Figs. 1 and 2, this movement occurs between the parts 22 and 23. In Fig. 3, relative movement and contact occurs at the pivot point 29. In Figs. 4 and 5, such contact occurs merely between the reduced end portions of the pins and the extension of the bracket, and again in Fig. 6, friction will be set up only at the pivot point 34. Thus a scale will be presented in which no anxiety need be felt incident to friction and in which, moreover, among others the several objects specifically afore referred to are achieved. It is intended, however, that numerous changes in construction and rearrangement of the parts might be resorted to without in the slightest departing from the spirit of this invention as defined by the claims.

Having described my invention, what I claim as new and desire to secure by Letters Patent, is:—

1. A scale including, in combination, a rockingly mounted beam, a flexion strip, a bracket connected to the upper end of said flexion strip, means for mounting the lower end of said flexion strip, registering means secured to said bracket, and connecting means extending between said bracket and said beam, the upper end of said connecting means being fixed with respect to said bracket, and means providing a movable coupling between said beam and the lower end of said connecting means.

2. A scale including, in combination, a rockingly mounted beam, a flexion strip, means for supporting said strip, a bracket connected to the movable end of said strip, a connecting element having one of its ends secured against movement with respect to said bracket, and means for movably associating the other end of said connecting means with said beam.

3. A scale including, in combination, a rockingly mounted beam, a flexion strip, means for supporting said strip, a bracket connected to the movable end of said strip, a connecting element having one of its ends secured against movement with respect to said bracket, means for movably associating the other end of said connecting means with said beam, and a registering mechanism having one of its elements connected to said bracket.

4. A scale including a rockingly mounted beam, a flexion strip, a bracket fixedly mounting the lower end of said flexion strip, a further bracket carried by the upper end of said strip, an indicating element coupled to said latter bracket, a connecting member having its upper end secured against movement with respect to said latter bracket, and means for movably connecting the lower end of said member to said beam.

5. A scale including a rockingly mounted beam, a bracket, a flexion strip carried by said bracket, a second bracket carried by the outer end of said strip, an extension forming a part of said second bracket, a connecting member having its upper end rigidly secured to said extension and means for movably connecting the lower end of said member to said beam.

6. A scale including a rockingly mounted beam, a bracket, a flexion strip extending adjacent to said beam and carried by said bracket, a connecting member embracing a resilient body, means for coupling one end of said member to the outer end of said flexion strip, and means for coupling the other end of said member to said beam.

7. A scale including a rockingly mounted beam, a bracket, a resilient member extending adjacent to said beam and carried by said bracket, a second resilient member having one of its ends connected to one of the ends of said first named member, and means for connecting the opposite end of said second member to said beam.

8. A scale including a rockingly mounted beam, a bracket, a resilient member extending adjacent to said beam and carried by said bracket, a second resilient member having one of its ends connected to one of the ends of said first named member, and means providing a pivot connection for coupling the opposite end of said second member to said beam.

9. A scale including a rockingly mounted beam, a bracket, a registering mechanism having movements substantially transverse of the beam movements, a resilient member extending adjacent to said beam and carried by said bracket, said registering mechanism being connected to said member, and a second resilient member connected to said first named member and to said means.

10. A scale including a rockingly mounted beam, a registering mechanism having movements substantially transverse of the beam movements, a resilient member extending adjacent to said beam, means for supporting said resilient member at one end thereof, said registering mechanism being connected to said member, a further resilient member connected to said first named member adjacent one of its ends, and means providing a rocking connection between the other end of said second member and said beam.

11. A scale including, in combination, a rockingly mounted beam, a pointer to have movements transversely of the beam movements, a flexion strip extending adjacent to said beam, means for supporting said flexion strip at one end thereof, said pointer being secured to the upper end of said flexion strip, a resilient element connected to said beam and flexion strip respectively and one of said latter connections being rigid, the other of the same being movable.

12. A scale including a rockingly mounted beam, a vertically extending flexion strip extending adjacent thereto, means for supporting said flexion strip at one end thereof, a bracket, a pointer secured to said bracket and said bracket being attached to said strip, and a resilient element extending adjacent to said strip and having one of its ends connected to said bracket, its opposite end being connected to said beam.

13. A scale including a rockingly mounted beam, a flexion strip extending centrally of said beam, means for supporting said flexion strip at one end thereof, a bracket at the upper and free end of said strip, an extension forming a part of said bracket, a pointer carried by said bracket, a resilient element having its upper end fixedly secured to the extension of said bracket and means connecting the lower end of said element to said beam.

14. A scale including a rockingly mounted beam, a flexion strip extending adjacent thereto, means for supporting said flexion strip at one end thereof, a second flexion strip extending adjacent said first named strip, having one of its ends connected thereto, and means connecting the opposite end of said flexion strip to said beam.

In testimony whereof I affix my signature.

CHARLES DOLLACK.